United States Patent
Kaur et al.

(10) Patent No.: US 9,644,050 B2
(45) Date of Patent: May 9, 2017

(54) PARTICLE SIZE DISTRIBUTION CONTROL THROUGH INTERNAL DONOR IN ZIEGLER-NATTA CATALYST

(71) Applicant: Indian Oil Corporation Limited, Bandra (East), Mumbai (IN)

(72) Inventors: Sukhdeep Kaur, Haryana (IN); Bhasker Bantu, Haryana (IN); Gurmeet Singh, Haryana (IN); Naresh Kumar, Haryana (IN); Shashikant, Haryana (IN); Gurpreet Singh Kapur, Haryana (IN); Biswajit Basu, Haryana (IN); Ravinder Kumar Malhotra, Haryana (IN)

(73) Assignee: Indian Oil Corporation Limited, Mumbai (IN)

( * ) Notice: Subject to any disclaimer, the term of this patent is extended or adjusted under 35 U.S.C. 154(b) by 137 days.

(21) Appl. No.: 14/794,148

(22) Filed: Jul. 8, 2015

(65) Prior Publication Data
US 2016/0009833 A1    Jan. 14, 2016

(30) Foreign Application Priority Data
Jul. 8, 2014 (IN) .......................... 2213/MUM/2014

(51) Int. Cl.
*C08F 110/06* (2006.01)

(52) U.S. Cl.
CPC ................................. *C08F 110/06* (2013.01)

(58) Field of Classification Search
None
See application file for complete search history.

(56) References Cited

U.S. PATENT DOCUMENTS

2003/0065111 A1* 4/2003 Yoshimura .............. C08F 10/00
526/124.3

OTHER PUBLICATIONS

STIC search report.*

* cited by examiner

*Primary Examiner* — Melvin C Mayes
*Assistant Examiner* — Stefanie Cohen
(74) *Attorney, Agent, or Firm* — Workman Nydegger (57) ABSTRACT

The present invention describes a process for controlling particle size of a catalyst composition. The process comprising the steps of contacting an internal donor with an organomagnesium precursor solution to form an intermediate solution and treating the intermediate solution with a transition metal compound to form a catalyst composition, wherein particle size of the catalyst composition is controlled by controlling a contact time of the internal donor with the precursor solution during formation of the intermediate solution.

18 Claims, 1 Drawing Sheet

PARTICLE SIZE DISTRIBUTION CONTROL THROUGH INTERNAL DONOR IN ZIEGLER-NATTA CATALYST

FIELD OF THE INVENTION

The present invention relates to a process for controlling particle size of a catalyst composition wherein particle size of the catalyst composition is controlled by controlling the contact time of internal donor with organomagnesium precursor solution during formation of intermediate solution.

BACKGROUND OF THE INVENTION

Ziegler-Natta catalyst systems are well known for their capability to polymerize olefins. They in general consist of a support which mostly is magnesium based onto which titanium component has been added along with organic compound known as internal donor. This catalyst when combined with co-catalyst and/or external donor comprise of the complete Ziegler-Natta catalyst system.

The particle size and its distribution is very important aspect of Ziegler-Natta catalysts as it effects the properties of the final polymer and hence its processibility. Generally, polymers having uniform particle distribution and uniformity in the particle size is preferred as leads to better and easy processing of the polymer. Keeping this aspect in mind various methodologies are adopted either at precursor or catalyst preparation stage to attain uniform particle size and distribution.

Various methodologies based on the chemical aspect of the formation of active $MgCl_2$ and on the incorporation of titanium and internal donor are followed. U.S. Pat. No. 4,220,554 describes using alcohol to dissolve $MgCl_2$ and the solution is then added in excess of $TiCl_4$ in the presence of internal donor at higher temperatures to allow precipitation of active $MgCl_2$. U.S. Pat. Nos. 4,399,054 and 4,469,648 describes the methodology for low temperature melt quenching of the dissolved $MgCl_2$ with alcohol at higher temperatures followed by dealcholation. EP1273595 describes the usage of emulsion stabilizer for controlling the particle size and shape. The catalyst is synthesized by reacting dialkylmagnesium with monohydric alcohol followed by dicarboxylic acid dihalide and chlorinated hydrocarbons in presence of viscoplex. After washing and isolation of this product, it is further treated with titanium compound for the formation of ZN catalyst which shows activity for propylene polymerization. U.S. Pat. No. 4,330,649 describes the in-situ formation of $MgCl_2$ by the reaction of a precursor such as $Mg(OR)_2$ with $TiCl_4$ in the presence of internal donor and halogenated solvent. U.S. Pat. No. 4,784,983 describe another methodology for obtaining uniform particles by dissolving $MgCl_2$ in organic epoxy and phosphorous compound and then adding $TiCl_4$. Further an auxiliary precipitant which can be organic anhydride or acid or ether or ketone is added to form precipitate which is separated and treated with $TiCl_4$ and inert diluents to obtain solid catalyst.

It is well known in the prior art that internal donor exerts a great deal of influence on the catalyst performance of the catalyst component for olefin polymerization. They generally satisfy the high industrial requirements for catalyst properties like high activity, high stereoregularity and high productivity but their role as control on particle size distribution is not known.

SUMMARY OF THE INVENTION

Accordingly, the present invention provides a process for controlling particle size of a catalyst composition, comprising the steps of:
  (i) contacting an internal donor with an organomagnesium precursor solution to form an intermediate solution; and
  (ii) treating the intermediate solution with a transition metal compound to form a catalyst composition,
  wherein particle size of the catalyst composition is controlled by controlling a contact time of the internal donor with the precursor solution during formation of the intermediate solution.

In an embodiment of the present invention, the internal donor used is selected from a group comprising of phthalates, benzoates, succinates, malonates, carbonates, diethers, and combinations thereof, wherein:
  (a) the phthalate is selected from a group comprising of di-n-butyl phthalate, di-i-butyl phthalate, di-2-ethylhexyl phthalate, di-n-octyl phthalate, di-i-octyl phthalate, di-n-nonyl phthalate;
  (b) the benzoate is selected from a group comprising of methyl benzoate, ethyl benzoate, propyl benzoate, phenyl benzoate, cyclohexyl benzoate, methyl toluate, ethyl toluate, p-ethoxy ethyl benzoate, p-isopropoxy ethyl benzoate;
  (c) the succinate is selected from a group comprising of diethyl succinate, di-propyl succinate, diisopropyl succinate, dibutyl succinate, diisobutyl succinate;
  (d) the malonate is selected from a group comprising of diethyl malonate, diethyl ethylmalonate, diethyl propyl malonate, diethyl isopropylmalonate, diethyl butylmalonate;
  (e) the carbonate compound is selected from a group comprising of diethyl 1,2-cyclohexanedicarboxylate, di-2-ethylhexyl 1,2-cyclohexanedicarboxylate, di-2-isononyl 1,2-cyclohexanedicarboxylate, methyl anisate, ethyl anisate; and
  (f) the diether compound is selected from a group comprising of 9,9-bis(methoxymethyl)fluorene, 2-isopropyl-2-isopentyl-1,3-dimethoxypropane, 2,2-diisobutyl-1,3-dimethoxypropane, 2,2-diisopentyl-1,3-dimethoxypropane, 2-isopropyl-2-cyclohexyl-1,3-dimethoxypropane.

In another embodiment of the present invention, the transition metal compound represented by $M(OR''')_p X_{4-p}$, where M is selected from a group comprising of Ti, V, Zr and Hf; X is a halogen atom; R''' is a hydrocarbon group and p is an integer having value equal or less than 4, the transition metal compound is selected from a group comprising of transition metal tetrahalide, alkoxy transition metal trihalide/aryloxy transition metal trihalide, dialkoxy transition metal dihalide, trialkoxy transition metal monohalide, tetraalkoxy transition metal, and mixtures thereof, wherein:
  (a) the transition metal tetrahalide is selected from a group comprising of titanium tetrachloride, titanium tetrabromide and titanium tetraiodide and the likes for V, Zr and Hf;
  (b) alkoxy transition metal trihalide/aryloxy transition metal trihalide is selected from a group comprising of methoxytitanium trichloride, ethoxytitanium trichloride, butoxytitanium trichloride and phenoxytitanium trichloride and the likes for V, Zr and Hf;
  (c) dialkoxy transition metal dihalide is diethoxy transition metal dichloride and the likes for V, Zr and Hf;

(d) trialkoxy transition metal monohalide is triethoxy transition metal chloride and the likes for V, Zr and Hf; and
(e) tetraalkoxy transition metal is selected from a group comprising of tetrabutoxy titanium and tetraethoxy titanium and the likes for V, Zr and Hf.

In yet another embodiment of the present invention, the transition metal compound is titanium compound represented by $Ti(OR'')_p X_{4-p}$, where X is a halogen atom; R'' is a hydrocarbon group and p is an integer having value equal or less than 4.

In yet another embodiment of the present invention, the organomagnesium precursor is liquid or solid in nature.

In yet another embodiment of the present invention, the organomagnesium precursor is liquid in nature and is prepared by contacting magnesium source with organohalide and alcohol in presence of a solvent in a single step.

In yet another embodiment of the present invention, the organomagnesium precursor is solid in nature and is prepared by first contacting the magnesium source with organohalide in presence of solvating agent as the first step and then followed by addition of alcohol. The solvating agent is selected from a group comprising of dimethyl ether, diethyl ether, dipropyl ether, diisopropyl ether, ethylmethyl ether, n-butylmethyl ether, n-butylethyl ether, di-n-butyl ether, di-isobutyl ether, isobutylmethyl ether, and isobutylethyl ether, dioxane, tetrahydrofuran, 2-methyl tetrahydrofuran, tetrahydropyran and combination thereof.

In yet another embodiment of the present invention, the magnesium source is selected from a group comprising of magnesium metal, dialkyl magnesium, alkyl/aryl magnesium halides and mixtures thereof; wherein:
(a) the magnesium metal is in form of powder, ribbon, turnings, wire, granules, block, lumps, chips;
(b) the dialkylmagnesium compounds is selected from a group comprising of dimethylmagnesium, diethylmagnesium, diisopropylmagnesium, dibutylmagnesium, dihexylmagnesium, dioctylmagnesium, ethylbutylmagnesium, and butyloctylmagnesium; and
(c) alkyl/aryl magnesium halides is selected from a group comprising of methylmagnesium chloride, ethylmagnesium chloride, isopropylmagnesium chloride, isobutylmagnesium chloride, tert-butylmagnesium chloride, benzylmagnesium chloride, methylmagnesium bromide, ethylmagnesium bromide, isopropylmagnesium bromide, isobutylmagnesium bromide, tert-butylmagnesium bromide, hexylmagnesium bromide, benzylmagnesium bromide, methylmagnesium iodide, ethylmagnesium iodide, isopropylmagnesium iodide, isobutylmagnesium iodide, tert-butylmagnesium iodide, and benzylmagnesium iodide.

In yet another embodiment of the present invention, the organohalide is selected from a group comprising of alkyl halides either branched or linear, halogenated alkyl benzene/benzylic halides having an alkyl radical contains from about 10 to 15 carbon atoms and mixtures thereof; wherein:
(a) the alkyl halides is selected from a group comprising of methyl chloride, ethyl chloride, propyl chloride, isopropyl chloride, dichloromethane, chloroform, carbon tetrachloride, 1,1-dichloropropane, 1,2-dichloropropane, 1,3-dichloropropane, 2,3-dichloropropane, n-butyl chloride, iso-butyl chloride, 1,4-dichlorobutane, tert-butylchloride, amylchloride, tert-amylchloride, 2-chloropentane, 3-chloropentane, 1,5-dichloropentane, 1-chloro-8-iodoctane, 1-chloro-6-cyanohexane, cyclopentylchloride, cyclohexylchloride, chlorinated dodecane, chlorinated tetradecane, chlorinated eicosane, chlorinated pentacosane, chlorinated triacontane, iso-octylchloride, 5-chloro-5-methyl decane, 9-chloro-9-ethyl-6-methyl eiscosane; and
(b) the halogenated alkyl benzene/benzylic halides is selected from a group comprising of benzyl chloride and α,α' dichloro xylene.

In yet another embodiment of the present invention, the alcohol is selected from a group comprising of aliphatic alcohols, alicyclic alcohols, aromatic alcohols, aliphatic alcohols containing an alkoxy group, diols and mixture thereof; wherein:
(a) the aliphatic alcohols is selected from a group comprising of methanol, ethanol, propanol, n-butanol, iso-butanol, t-butanol, n-pentanol, iso-pentanol, n-hexanol, 2-methylpentanol, 2-ethylbutanol, n-heptanol, n-octanol, 2-ethylhexanol, decanol and dodecanol,
(b) the alicyclic alcohols is selected from a group comprising of cyclohexanol and methylcyclohexanol,
(c) the aromatic alcohols is selected from a group comprising of benzyl alcohol and methylbenzyl alcohol,
(d) the aliphatic alcohols containing an alkoxy group is selected from a group comprising of ethyl glycol and butyl glycol;
(e) the diols is selected from a group comprising of catechol, ethylene glycol, 1,3-propanediol, 1,4-butanediol, 1,5-pentanediol, 1,8-octanediol, 1,2-propanediol, 1,2-butanediol, 2,3-butanediol, 1,3-butanediol, 1,2-pentanediol, p-menthane-3,8-diol, and 2-methyl-2,4-pentanediol.

In yet another embodiment of the present invention, organomagnesium precursor solution is obtained by dissolving the organomagnesium precursor in a solvent. The solvent is selected from group comprising of chlorinated aromatic hydrocarbon, non-chlorinated aromatic hydrocarbon chlorinated aliphatic hydrocarbon, non-chlorinated aliphatic hydrocarbon and combination thereof. The solvent comprises from 5 to 95 volume percent and is selected from group comprising of benzene, decane, kerosene, ethyl benzene, chlorobenzene, dichlorobenzene, toluene, o-chlorotoluene, xylene, dichloromethane, chloroform, cyclohexane and combination thereof.

In yet another embodiment of the present invention, the internal donor is contacted with an organomagnesium precursor solution at a temperature form −30 to 100° C.

In yet another embodiment of the present invention, the catalyst composition is Ziegler-Natta catalyst.

In yet another embodiment of the present invention, controlling the contact time of the internal donor with the precursor solution during formation of the intermediate solution comprises:
maintaining the contact time of the internal donor with the precursor solution during formation of the intermediate solution between 5 to 120 minutes to obtain the catalyst composition having average particle size in the range of 10 to 60 microns;
maintaining the contact time of the internal donor with the precursor solution during formation of the intermediate solution between 10 to 90 minutes to obtain the catalyst composition having average particle size in the range of 20 to 50 microns; and
maintaining the contact time of the internal donor with the precursor solution during formation of the intermediate solution between 10 to 60 minutes to obtain the catalyst composition having average particle size in the range of 20 to 45 microns.

In yet another embodiment of the present invention, controlling the contact time of the internal donor with the precursor solution during formation of the intermediate solution comprises:

maintaining the contact time of the internal donor with the precursor solution during formation of the intermediate solution between 5 to 30 minutes to obtain the catalyst composition having average particle size in the range of 10 to 20 microns;

maintaining the contact time of the internal donor with the precursor solution during formation of the intermediate solution between >30 to 50 minutes to obtain the catalyst composition having average particle size in the range of 25 to 33 microns;

maintaining the contact time of the internal donor with the precursor solution during formation of the intermediate solution between >50 to 90 minutes to obtain the catalyst composition having average particle size in the range of 35 to 47 microns; and maintaining the contact time of the internal donor with the precursor solution during formation of the intermediate solution greater than 90 minutes to obtain the catalyst composition having average particle size of ≥1900 microns.

DETAILED DESCRIPTION OF THE INVENTION

Figure 1:
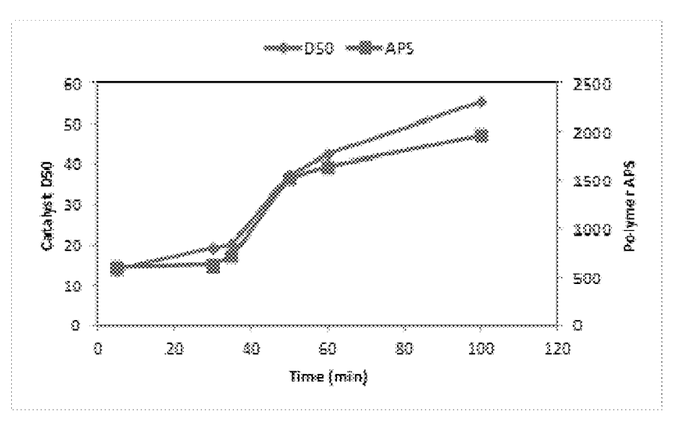
The FIGURE depicts the effect of internal donor contact time on the catalyst as well as polymer particle, D50 of the catalysts synthesized using same precursor (here MGP #98) with different contact time are plotted along with the APS of the subsequent polymer.

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The present invention discloses a process for preparation of a catalyst composition involving controlling the particle size and its distribution for the Ziegler-Natta catalyst resulting in synthesis of solid polymer. The control on the particle size and its distribution is brought about when an internal donor is contacted with an organomagnesium precursor solution. It was observed that variation in the contact time between internal donor and the organomagnesium precursor solution, before it comes in contact with titanium compound, leads to variation in particle size and its distribution in the catalyst.

An aspect of the present invention discloses a process for controlling the particle size distribution of the Ziegler-Natta catalyst by the internal donor. Yet another aspect involves the process for preparation of Ziegler-Natta catalyst of any desirable particle size, using internal donor to control variations in particle size.

In accordance with the present invention, at least one internal donor is contacted with an organomagnesium precursor solution for a period of time to form a first contacted solution. The first contacted solution is mixed with a titanium compound to form a catalyst composition, wherein variation in contact time of the internal donor with the organomagnesium precursor solution before it comes in contact with the titanium compound controls the variation in the particle size and its distribution of the catalyst composition.

In accordance with the present invention, the internal donor is contacted with an organomagnesium precursor solution for the period of time from immediate to 10 h, more preferably from immediate to 5 h, more preferably from immediate to 2 h. Further in accordance with the present invention, the internal donor is contacted with an organomagnesium precursor solution at a temperature from −30 to 100° C. The particle size and its distribution of the catalyst composition obtained in accordance with the present invention, is in the range of 10 to 150 μm.

In general, the average particle size of solid catalyst particles (D50) is in a range of from 10 to 150 μm, preferably from 15 to 90 μm. In the process for preparing catalyst particles according to the present invention, the desired average particles size i.e. 15 to 90 μm, of the obtained spherical solid catalyst particles (D50) can be regulated by varying the contact time between the internal donor and the organomagnesium compound. The desired contact time according to the present invention is immediate to 2 h. The average particle size and particle size distribution of solid particles can be measured by a laser granulometer. In the present invention, as the contact time of the internal donor with the organomagnesium compound increases, the D50 of the generated catalyst particles also increases (Table 3).

In accordance with the present invention, the organomagnesium precursor is prepared through the process as described in WO2014/045259 and WO2014/045260.

According to the present invention, the organomagnesium precursor contains magnesium and may be liquid or solid in nature. In an embodiment, the magnesium based precursor is liquid in nature and is prepared by contacting magnesium source with organohalide and alcohol in presence of the solvent in a single step. In another embodiment, the organomagnesium precursor is solid in nature and is prepared by first contacting the magnesium source with organohalide in presence of solvating agent as the first step and then followed by addition of alcohol. The solid organomagnesium precursor is obtained either by removal of solvating agent or by precipitation methodology.

The organomagnesium precursor solution is obtained by dissolving the organomagnesium precursor in a solvent. The solvent used in accordance with the present invention is selected from group comprising of chlorinated aromatic hydrocarbon, non chlorinated aromatic hydrocarbon chlorinated aliphatic hydrocarbon, non chlorinated aliphatic hydrocarbon and combination thereof. Further, in an embodiment of the present invention, wherein the solvent comprises from 5 to 95 volume percent and is selected from group comprising of benzene, decane, kerosene, ethyl benzene, chlorobenzene, dichlorobenzene, toluene, o-chlorotoluene, xylene, dichloromethane, chloroform, cyclohexane and combination thereof.

The internal donor used in accordance with the present invention is selected from a group comprising of phthalates, benzoates, succinates, malonates, carbonates, diethers, and combinations thereof. The phthalate is selected from a group comprising of di-n-butyl phthalate, di-i-butyl phthalate, di-2-ethylhexyl phthalate, di-n-octyl phthalate, di-i-octyl phthalate, di-n-nonyl phthalate. The benzoate is selected from a group comprising of methyl benzoate, ethyl benzoate, propyl benzoate, phenyl benzoate, cyclohexyl benzoate, methyl toluate, ethyl toluate, p-ethoxy ethyl benzoate, p-isopropoxy ethyl benzoate. The succinate is selected from a group comprising of diethyl succinate, di-propyl succinate, diisopropyl succinate, dibutyl succinate, diisobutyl succinate. The malonate is selected from a group comprising of diethyl malonate, diethyl ethylmalonate, diethyl propyl malonate, diethyl isopropylmalonate, diethyl butylmalonate. The carbonate compound is selected from a group comprising of diethyl 1,2-cyclohexanedicarboxylate, di-2-ethylhexyl 1,2-cyclohexanedicarboxylate, di-2-isononyl 1,2-cyclohexanedicarboxylate, methyl anisate, ethyl anisate. The diether compound is selected from a group comprising of 9,9-bis(methoxymethyl)fluorene, 2-isopropyl-2-isopentyl-1,3-dimethoxypropane, 2,2-diisobutyl-1,3-dimethoxypropane, 2,2-diisopentyl-1,3-dimethoxypropane, 2-isopropyl-2-cyclohexyl-1,3-dimethoxypropane, preferably di-isobutyl phthalate.

Further, the present invention provides a catalyst composition. The catalyst composition includes combination of a magnesium moiety, other metal moiety and an internal donor. The magnesium moiety includes the organomagnesium precursor of the present invention. The other metal moiety can be a main group metal or a transition metal, or a transition metal of IIIB-VIIIB element. In an embodiment, the transition metal compound represented by $M(OR''')_p X_{4-p}$ is selected from a group comprising of transition metal tetrahalide, alkoxy transition metal trihalide/aryloxy transition metal trihalide, dialkoxy transition metal dihalide, trialkoxy transition metal monohalide, tetraalkoxy transition metal, and mixtures thereof, wherein:

(a) the transition metal tetrahalide is selected from a group comprising of titanium tetrachloride, titanium tetrabromide and titanium tetraiodide and the likes for V, Zr and Hf;

(b) alkoxy transition metal trihalide/aryloxy transition metal trihalide is selected from a group comprising of methoxytitanium trichloride, ethoxytitanium trichloride, butoxytitanium trichloride and phenoxytitanium trichloride and the likes for V, Zr and Hf;

(c) dialkoxy transition metal dihalide is diethoxy transition metal dichloride and the likes for V, Zr and Hf;

(d) trialkoxy transition metal monohalide is triethoxy transition metal chloride and the likes for V, Zr and Hf; and (e) tetraalkoxy transition metal is selected from a group comprising of tetrabutoxy titanium and tetraethoxy titanium and the likes for V, Zr and Hf.

The contact of organomagnesium precursor solution, precontacted with the internal donor, with transition metal compound can be either neat or in solvent which can be chlorinated or non chlorinated aromatic or aliphatic in nature examples not limiting to benzene, decane, kerosene, ethyl benzene, chlorobenzene, dichlorobenzene, toluene, o-chlorotoluene, xylene, dichloromethane, chloroform, cyclohexane and the like, comprising from 40 to 60 volume percent.

In an embodiment, either the transition metal compound is added to the organomagnesium precursor solution precontacted with the internal donor or organomagnesium precursor solution precontacted with the internal donor is added to the transition metal compound, preferably, organomagnesium compound precontacted with the internal donor is added to transition metal compound. In another embodiment, this addition is either one shot or dropwise.

It is believed that liquid titanium compound helps in the formation of amorphous $MgCl_2$ as it acts as halogenating agent as well as is dispersed and supported on the catalyst surface. In an embodiment, the titanium compound is added in amounts ranging from usually about at least 1 to 200 moles, preferably, 3 to 200 moles and more preferably, 5 moles to 100 moles, with respect to one mole of magnesium.

Typically, the contact procedure for transition metal and magnesium component is slowly with dropwise addition at desired temperature and then heated to activate the reaction between both the components. In a preferred embodiment, this reaction system is gradually heated to the temperature effective to carry out the reaction, preferably about −50° C. and about 150° C., and more preferably about −30° C. and about 120° C., and heating is instigated at a rate of 0.1 to 10.0° C./minute, or at a rate of 1 to 5.0° C./minute. The resultant is the solid component in the solvent comprising of magnesium, transition metal and halogen components.

The procedure of contacting the transition metal component may be repeated one, two, three or more times as desired. In an embodiment, the resulting solid material recovered from the mixture can be contacted one or more times with the mixture of liquid transition metal component in solvent for at least 10 minutes up to 60 minutes, at temperature from about 25° C. to about 150° C., preferably from about 30° C. to about 110° C.

The resulting solid component comprising of magnesium, transition metal, halogen and the internal electron donor can be separated from the reaction mixture either by filtration or decantation and finally washed with inert solvent to remove unreacted transition metal component and other side products. Usually, the resultant solid material is washed one or more times with inert solvent which is typically a hydrocarbon including, not limiting to aliphatic hydrocarbon like isopentane, isooctane, hexane, pentane or isohexane. In an embodiment, the resulting solid mixture is washed one or more times with inert hydrocarbon based solvent preferably, hexane at temperature from about 20° C. to about 80° C., preferably from about 25° C. to about 70° C. The solid catalyst then can be separated and dried or slurried in a hydrocarbon specifically heavy hydrocarbon such as mineral oil for further storage or use.

In an embodiment, the catalyst composition includes from about 5.0 wt % to 20 wt % of internal electron donor, transition metal is from about 1.0 wt % to 6.0 wt % and magnesium is from about 15 wt % to 20 wt %.

The present invention provides the catalyst system for polymerization of olefins. In the embodiment, the method of polymerization process is provided where the catalyst system is contacted with olefin under polymerization conditions. The catalyst system includes catalyst composition, organoaluminum compounds and external electron donors. The catalyst composition includes combination of magnesium moiety precontacted with internal donor and transition metal moiety.

The present invention provides the method of polymerizing and/or copolymerizing olefins. In the embodiment, the method of polymerization process is provided where the catalyst system is contacted with olefin under polymerization conditions. The catalyst system includes catalyst composition, cocatalyst and external electron donors.

The catalyst composition includes combination of magnesium moiety precontacted with internal donor and transition metal moiety. The cocatalyst may include hydrides, organoaluminum, lithium, zinc, tin, cadmium, beryllium, magnesium, and combinations thereof. In an embodiment, the cocatalyst is organoaluminum compounds.

The present invention provides the method of polymerizing and/or copolymerizing olefins. In the embodiment, the method of polymerization process is provided where the catalyst system is contacted with olefin under polymerization conditions. The catalyst system includes catalyst composition, organoaluminum compounds and external electron donors. The catalyst composition includes combination of magnesium moiety precontacted with internal donor and titanium moiety.

The olefins includes from C2-C20. The ratio of transition metal (from catalyst composition): aluminum (from organoaluminum compound): external donor can be from 1:5-1000: 0-250, preferably in the range from 1:25-500:25-100.

The present invention provides the catalyst system. The catalyst system includes catalyst component, organoaluminum compounds and external electron donors. In an embodiment, the organoaluminum compounds include, but not limiting to, alkylaluminums such as trialkylaluminum such as preferably triethylaluminum, triisopropylaluminum, triisobutylaluminum, tri-n-butylaluminum, tri-n-hexylaluminum, tri-n-octylaluminum; trialkenylaluminums such as triisoprenyl aluminum; dialkylaluminum halides such as diethylaluminum chloride, dibutylaluminum chloride, diisobutylaluminum chloride and diethyl aluminum bromide; alkylaluminum sesquihalides such as ethylaluminum sesquichloride, butylaluminum sesquichloride and ethylaluminum sesquibromide; dialkylaluminum hydrides such as diethylaluminum hydride and dibutylaluminum hydride; partially hydrogenated alkylaluminum such as ethylaluminum dihydride and propylaluminum dihydride and aluminoxane such as methylaluminoxane, isobutylaluminoxane, tetraethylaluminoxane and tetraisobutylaluminoxane; diethylaluminum ethoxide. The mole ratio of aluminum to titanium, in accordance with the present invention, is from about 5:1 to about 1000:1 or from about 10:1 to about 700:1, or from about 25:1 to about 500:1.

The present invention provides the catalyst system. The catalyst system includes catalyst component, organoaluminum compounds and external electron donors. The external electron donors are organosilicon compounds, diethers and alkoxy benzoates. The external electron donor for olefin polymerization when added to the catalytic system as a part of cocatalyst retains the stereospecificity of the active sites, convert non-stereospecific sites to stereospecific sites, poisons the non-stereospecific sites and also controls the molecular weight distributions while retaining high performance with respect to catalytic activity. The external electron donors which are generally organosilicon compounds includes, but are not limited to, trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, and methyltriallyloxysilane, cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis (2-methylcyclopentyl)dimethoxysilane, bis(3-tertiary butylcyclopentyl)dimethoxysilane, bis(2,3-dimethylcyclopentyl) dimethoxysilane, bis(2,5-dimethylcyclopentyl) dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis (1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfiuorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane, diindenylcyclopentylmethoxysilane and ethylenebis-cyclopentyldimethoxysilane; aminosilanes such as aminopropyltriethoxysilane, n-(3-triethoxysilylpropyl)amine, bis[(3-triethoxysilyl)propyl]amine, aminopropyltrimethoxysilane, aminopropylmethyldiethoxysilane, hexanediaminopropyltrimethoxysilane.

In an embodiment, the external electron donor, other than organosilicon compounds include, but not limited to amine, diether, esters, carboxylate, ketone, amide, phosphine, carbamate, phosphate, sulfonate, sulfone and/or sulphoxide. The external electron donor is used in such an amount to give a molar ratio of organoaluminum compound to the said external donor from about 0.1 to 500, preferably from 1 to 300.

In accordance with the present invention, the polymerization of olefins is carried out in the presence of the catalyst system described above. The catalyst system is contacted with olefin under polymerization conditions to produce desired polymer products. The polymerization process can be carried out such as slurry polymerization using diluent which is an inert hydrocarbon solvent, or bulk polymerization using the liquid monomer as a reaction medium and in gas-phase operating in one or more fluidized or mechanically agitated bed reactors.

The catalyst of the invention can be used in the polymerization of the above-defined olefin $CH_2=CHR$, the examples of said olefin include ethylene, propylene, 1-butene, 4-methyl-1-pentene, 1-hexene, and 1-octene. In particular, said catalyst can be used to produce, such as, the following products: high-density polyethylene (HDPE, having a density higher than 0.940 $g/cm^3$), which includes ethylene homopolymer and copolymer of ethylene and α-olefins having 3 to 12 carbon atoms; linear low-density polyethylene (LLDPE, having a density lower than 0.940 $g/cm^3$), and very low density and ultra low density polyethylene (VLDPE and ULDPE, having a density lower than 0.920 $g/cm^3$, and as low as 0.880 $g/cm^3$), consisting of the copolymer of ethylene and one or more α-olefins having 3 to 12 carbon atoms, wherein the molar content of the unit derived from ethylene is higher than 80%; elastomeric copolymer of ethylene and propylene, and elastomeric terpolymers of ethylene and propylene as well as diolefins at a small ratio, wherein the weight content of the unit derived from ethylene is between about 30% and 70%; isotactic polypropylene and crystalline copolymer of propylene and ethylene and/or other α-olefins, wherein the content of the unit derived from propylene is higher than 85% by weight (random copolymer); impact propylene polymer, which are produced by sequential polymerization of propylene and the mixture of propylene and ethylene, with the content of ethylene being up to 40% by weight; copolymer of propylene and 1-butene, containing a great amount, such as from 10 to 40 percent by weight, of unit derived from 1-butene. It is especially significant that the propylene polymers produced by using the catalysts of the invention have very high isotactic index.

The polymerization is carried out at a temperature from 20 to 120° C., preferably from 40 to 80° C. When the polymerization is carried out in gas phase, operation pressure is usually in the range of from 5 to 100 bar preferably from 10 to 50 bar. The operation pressure in bulk polymerization is usually in the range of from 10 to 150 bar, preferably from 15 to 50 bar. The operation pressure in slurry polymerization is usually in the range of from 1 to 10 bar, preferably from 2 to 7 bar. Hydrogen can be used to control the molecular weight of polymers.

In the present invention, the polymerization of olefins is carried out in the presence of the catalyst system described above. The described catalyst can be directly added to the reactor for polymerization or can be prepolymerized i.e., catalyst is subjected to a polymerization at lower conversion extent before being added to polymerization reactor. Prepolymerization can be performed with olefins preferably ethylene and/or propylene where the conversion is controlled in the range from 0.2 to 500 gram polymer per gram catalyst.

In the present invention, the polymerization of olefins in presence of the described catalyst system leads to the formation of polyolefins having xylene soluble (XS) from about 0.2% to about 15%. In another embodiment, polyolefins having xylene soluble (XS) from about 2% to about 8%. Here XS refers to the weight percent of polymer that get dissolves into hot xylene generally for measuring the tacticity index such as highly isotactic polymer will have low XS % value i.e. higher crystallinity, whereas low isotactic polymer will have high XS % value.

The present invention provides the catalyst system. The catalysts system when polymerizes olefins provides polyolefins having melt flow indexes (MFI) from about 0.1 to about 100 which is measured according to ASTM standard D1238. In an embodiment, polyolefins having MFI from about 5 to about 30 are produced. The present invention provides the catalyst system. The catalysts system when polymerizes olefins provides polyolefins having bulk densities (BD) of at least about 0.3 cc/g.

The following non-limiting examples illustrate in details about the invention. However, they are, not intended to be limiting the scope of present invention in any way.

EXAMPLE 1

Preparation of Organomagnesium Compound

Liquid Magnesium Based Precursor

In 500 ml glass reactor maintained at 25° C., calculated amount of magnesium (powder or turnings) were weighed and added into the reactor followed by addition of calculated amount of organohalide followed by alcohol in toluene. This mixture was stirred and gradually heated to 90° C.±3. After the activation of the reaction, the mixture was allowed to be maintained at same temperature for 6 h. The resulting solution was viscous in nature. The organomagnesium compounds synthesized by the above procedure have been tabulated in Table 1.

TABLE 1

| | Liquid Precursor | | | | | | |
|---|---|---|---|---|---|---|---|
| Precursor | Mg Ratio | Benzyl chloride Ratio | BuCl Ratio | Alcohol Ratio | Solvent | Alcohol | Mg (wt %) |
| MGP#183 | 1 | 1 | 0 | 1.4 | toluene | 2-ethyl-1-hexanol | 1.1 |

Solid Magnesium Based Precursor

In 500 ml glass reactor maintained at 0° C., calculated amount of magnesium (powder or turnings) were weighed and added into the reactor followed by addition of calculated amount of organohalide followed by diethyl ether. This mixture was stirred and after the activation of the reaction, the mixture was allowed to be maintained at same temperature until all magnesium has reacted. To the resulting solution, the calculated amount of alcohol was added dropwise over a period of 1-2 h. After the completion of addition, the solution was allowed to stir for another 0.5 h. Finally, ether was evaporated and solid compound was analyzed. In case of precipitation methodology, the resulting solution prepared using magnesium and organohalide in diethyl ether was precipitated out in the desired amount of alcohol/hexane mixture The organomagnesium compounds synthesized by the above procedure have been tabulated in Table 2.

TABLE 2

| Precursor | Mg Ratio | Benzyl chloride Ratio | Alcohol Ratio | Solvent | Alcohol | Mg (wt %) | Cl (wt %) |
|---|---|---|---|---|---|---|---|
| MGP#75 | 1 | 1.1 | 1 | diethyl ether | 2-ethyl-1-hexanol | 12.5 | 18.7 |
| MGP#88 | 1 | 1.1 | 1 | diethyl ether | 2-ethyl-1-hexanol | 12.6 | 18.9 |
| MGP#95 | 1 | 1.1 | 1 | diethyl ether | 2-ethyl-1-hexanol | 12.6 | 18.9 |
| MGP#98 | 1 | 1.1 | 1 | diethyl ether | 2-ethyl-1-hexanol | 12.5 | 18.5 |
| MGP#126 | 1 | 1.1 | 1 | diethyl ether | 2-ethyl-1-hexanol | 12.4 | 18.3 |
| MGP#171 | 1 | 1.1 | 1 | diethyl ether | 2-ethyl-1-hexanol | 12.9 | 18.1 |
| MGP#173 | 1 | 1.1 | 1 | diethyl ether | 2-ethyl-1-hexanol | 12.0 | 17.7 |
| MGP#174 | 1 | 1.02 | 1 | diethyl ether | 2-ethyl-1-hexanol | 11.27 | 18.25 |

The five batches of precursor synthesized under similar conditions shows similar compositions as desired.

Preparation of the Catalyst Component

In a two neck round bottom flask, 100 ml of the organomagnesium precursor was added followed by the addition of internal donor. This precontacted solution was stirred for the desired time and then charged under nitrogen into the reactor containing 60 ml of TiCl$_4$ solution maintained at desired temperature over a period of 10 min and stirred for another 15 min. The resultant solution was clear orange in color. Gradually the reaction temperature was increased to 110° C. and maintained for 1 h. After settling and decantation, the suspended solid was again treated with 60 ml TiCl$_4$ and 60 ml chlorobenzene and after temperature reached 110° C., the mixture was maintained under stifling for 15 minutes. The above step was again repeated. After the reaction was finished, the solid was decanted and washed sufficiently with hexane at 70° C., respectively and further dried under hot nitrogen till freely flowing.

The solid catalysts composition synthesized by the above procedure has been tabulated in Table 3.

TABLE 3

| Catalyst | Precursor | ID contact time/temp min/° C. | Precursor & TiCl$_4$ contact temperature ° C. | Ti (wt %) | Mg (wt %) | Donor (wt %) | D50 (Micron) |
|---|---|---|---|---|---|---|---|
| ZN#217 | MGP#75 | 90/30 | −20 | 2.3 | 17.6 | 12.5 | 46.2 |
| ZN#244 | DIBP as internal donor | 30/30 | −20 | 3.0 | 18.0 | 15.0 | 19.2 |
| ZN#216 | MGP#88 | 90/30 | −20 | 2.5 | 14.0 | 11.6 | 41.5 |
| ZN#219 | DIBP as | 30/30 | −20 | 2.4 | 16.6 | 14.6 | 19.0 |
| ZN#228 | internal donor | 5/30 | −20 | 2.8 | 19.5 | 16.5 | 11.0 |
| ZN#224 | MGP#95 | 90/30 | −20 | 3.0 | 16.9 | 15.7 | 49.3 |
| ZN#233 | DIBP as | 30/30 | −20 | 2.9 | 16.9 | 20.6 | 19.5 |
| ZN#227 | internal donor | 5/30 | −20 | 2.4 | 17.7 | 16.1 | 14.0 |
| ZN#241 | MGP#98 | 110/30 | −20 | 2.4 | 17.1 | 15.7 | 55.6 |
| ZN#240 | DIBP as | 60/30 | −20 | 2.6 | 17.3 | 15.5 | 42.4 |
| ZN#234 | internal donor | 50/30 | −20 | 2.6 | 17.4 | 17.5 | 37.2 |
| ZN#235 |  | 35/30 | −20 | 3.0 | 17.2 | 17.1 | 20.1 |
| ZN#239 |  | 30/30 | −20 | 2.4 | 17.4 | 15.9 | 19.2 |
| ZN#236 |  | 5/30 | −20 | 3.0 | 17.3 | 15.8 | 13.8 |
| ZN#274 | MGP#126 | 60/30 | −20 | 2.6 | 17.7 | 14.9 | 46.7 |
| ZN#277 | DIBP as | 30/30 | −20 | 2.9 | 18.6 | 14.5 | 13.9 |
| ZN#275 | internal donor | 10/30 | −20 | 2.8 | 19.2 | 14.5 | 11.5 |
| ZN#416 | MGP#171 | 35/30 | −5 | 3.2 | 15.8 | 12.9 | 23.1 |
| ZN#417 | DIBP as | 40/30 | −5 | 3.2 | 18.4 | 14.9 | 25.3 |
| ZN#431 | internal donor | 45/30 | −5 | 2.5 | 17.3 | 12.1 | 32.4 |
| ZN#456 | MGP#183 | 5/30 | −5 | 1.6 | 18.5 | 18.2 | 10.2 |
| ZN#457 | DIBP as | 15/30 | −5 | 1.6 | 18.5 | 18.3 | 15.7 |
| ZN#458 | internal donor | 30/30 | −5 | 3.4 | 17.8 | 15.1 | 19.9 |
| ZN#459 |  | 60/30 | −5 | 3.1 | 18.5 | 10.9 | 45.0 |
| ZN#464 | MGP#173 Diether as internal donor | 5/30 | 0 | 4.1 | 14.7 | 22.7 | 17.8 |
| ZN#465 | MGP#173 Ethyl benzoate as internal donor | 5/30 | 70 | 3.5 | 16.9 | 18.2 | 16.5 |
| ZN#466 | MGP#173 Diethyl malonate as internal donor | 5/30 | −5 | 2.4 | 19.8 | 9.8 | 14.5 |
| ZN#467 | MGP#174 | DIBP addition after precursor and TiCl$_4$ contact | 40 | 2.3 | 12.7 | 20.1 | 18.2 |
| ZN#524 | MGP#174 | 90/30 | −20 | 3.7 | 19.1 | 7.4 | 49.1 |
| ZN#521 | DIBP as | 30/30 | −20 | 3.4 | 18.0 | 12.8 | 20.9 |
| ZN#522 | internal donor | 5/30 | −20 | 3.3 | 17.9 | 13.6 | 14.3 |
| ZN#526 Comparative Example | MGP#174 DIBP as internal donor | 90/30 (DIBP addition after precursor and TiCl$_4$ contact) | −20 | 3.2 | 18.5 | 11.7 | 24.3 |
| ZN#523 Comparative Example |  | 30/30 (DIBP addition after precursor and TiCl$_4$ contact) | −20 | 3.2 | 18.2 | 12.8 | 14.1 |
| ZN#525 Comparative Example |  | 5/30 (DIBP addition after precursor and TiCl$_4$ contact) | −20 | 3.1 | 19.6 | 7.8 | 57.8 |

Remark: Catalyst synthesis process involved temp ramp from −20° C. to 110° C. for 120 min; Three titanation @110° C.

The table describes the various catalyst synthesis carried out using different batches of precursors varying the contact time of the internal donor with the precursor solution. The composition of the catalysts synthesized remains within the range despite the variations in catalyst synthesis process.

Slurry Polymerization of Propylene

Propylene polymerization was carried out in 1 L buchi reactor which was previously conditioned under nitrogen. The reactor was charged with 250 ml of dry hexane containing solution of 10 wt % triethylaluminum followed by 100 ml of dry hexane containing 10 wt % solution of triethylaluminum, 5 wt % solution of cyclohexy methyl dimethoxysilane and weighed amount of catalyst. The reactor was charged with hydrogen and then pressurized with 71 psi of propylene under stifling at 750 rpm. The reactor was heated to and then held at 70° C. for 2 hour. At the end, the reactor was vented and the polymer was recovered at ambient conditions. Catalyst performance and polymer properties has been tabulated in Table 4

TABLE 4

| CATALYST | | | POLYMERIZATION | | | | | POLYMER ANALYSIS | |
|---|---|---|---|---|---|---|---|---|---|
| Cat No | Precursor | ID contact time/temp min/° C. | Cat wt (mg) | Al/Ti ratio | H2 ml | Al/Do ratio | Activity kgPP/gcat | APS (micron) | BD (tapped) |
| ZN#217 | MGP#75 | 90/30 | 10.1 | 500 | 10 | 20 | 8.6 | 1725 | 0.37 |
| ZN#244 | | 30/30 | 10.3 | 500 | 10 | 30 | 7.3 | 564 | 0.40 |
| ZN#216 | MGP#88 | 90/30 | 12.1 | 500 | 10 | 20 | 6.5 | 1841 | 0.3 |
| ZN#219 | | 30/30 | 10 | 500 | 10 | 20 | 7.9 | 628 | 0.32 |
| ZN#228 | | 5/30 | 10.2 | 500 | 10 | 30 | 7.7 | 567 | 0.39 |
| ZN#224 | MGP#95 | 90/30 | 10.6 | 500 | 10 | 20 | 8.3 | 1582 | 0.32 |
| ZN#233 | | 30/30 | 10.4 | 500 | 10 | 30 | 8.5 | 684 | 0.34 |
| ZN#227 | | 5/30 | 10 | 500 | 10 | 30 | 7.3 | 535 | 0.38 |
| ZN#241 | MGP#98 | 110/30 | 10 | 500 | 10 | 30 | 7.4 | 1969 | 0.27 |
| ZN#240 | | 60/30 | 10.6 | 500 | 10 | 30 | 7.4 | 1636 | 0.30 |
| ZN#234 | | 50/30 | 10 | 500 | 10 | 30 | 8.1 | 1516 | 0.32 |
| ZN#235 | | 35/30 | 10.2 | 500 | 10 | 30 | 5.7 | 712 | 0.35 |
| ZN#239 | | 30/30 | 10.4 | 500 | 10 | 30 | 8.9 | 619 | 0.34 |
| ZN#236 | | 5/30 | 10.4 | 500 | 10 | 30 | 8.5 | 595 | 0.38 |
| ZN#274 | MGP#126 | 60/30 | 10.2 | 500 | 10 | 20 | 9.5 | 1112 | 0.34 |
| ZN#277 | | 30/30 | 10.2 | 500 | 10 | 20 | 9.3 | 582 | 0.34 |
| ZN#275 | | 10/30 | 10.1 | 500 | 10 | 20 | 9.7 | 539 | 0.38 |
| ZN#416 | MGP#171 | 35/30 | 10.2 | 500 | 10 | 20 | 7.7 | 995 | 0.40 |
| ZN#417 | | 40/30 | 10.4 | 500 | 10 | 20 | 8.0 | 1182 | 0.40 |
| ZN#431 | | 45/30 | 10.1 | 500 | 10 | 20 | 8.1 | 1348 | 0.44 |
| ZN##456 | MGP#183 | 5/30 | 10.3 | 500 | 10 | 20 | 0.5 | nd | nd |
| ZN#457 | | 15/30 | 10.1 | 500 | 10 | 20 | 0.5 | nd | nd |
| ZN#458 | | 30/30 | 10.1 | 500 | 10 | 20 | 9.0 | 715 | 0.35 |
| ZN##459 | | 60/30 | 10.1 | 500 | 10 | 20 | 5.9 | 1130 | 0.40 |
| ZN#464 | MGP#173 | 5/30 | 10.5 | 500 | 10 | 20 | 5.7 | 1480 | 0.32 |
| ZN#465 | MGP#173 | 5/30 | 10.2 | 500 | 10 | 20 | 3.9 | 1419 | 0.20 |
| ZN#466 | MGP#173 | 5/30 | 10.4 | 500 | 10 | 20 | 4.5 | 1214 | 0.25 |
| ZN#467 | MGP#174 | DIBP addition after precursor and TiCl$_4$ contact | 10.2 | 500 | 10 | 20 | 3.9 | 1417 | 0.25 |
| ZN#524 | MGP#174 | 90/30 | 10.0 | 500 | 10 | 20 | 6.2 | 1678 | 0.35 |
| ZN#521 | MGP#174 | 30/30 | 10.5 | 500 | 10 | 20 | 7.1 | 618 | 0.32 |
| ZN#522 | MGP#174 | 5/30 | 10.2 | 500 | 10 | 20 | 6.3 | 539 | 0.40 |
| ZN#526 Comparative Example | MGP#174 | 90/30 (DIBP addition after precursor and TiCl$_4$ contact) | 10.3 | 500 | 10 | 20 | 5.3 | 1380 | 0.35 |
| ZN#523 Comparative Example | MGP#174 | 30/30 (DIBP addition after precursor and TiCl$_4$ contact) | 10.2 | 500 | 10 | 20 | 6.4 | 1501 | 0.32 |

TABLE 4-continued

| Cat No | Precursor | CATALYST ID contact time/temp min/° C. | Cat wt (mg) | POLYMERIZATION Al/Ti ratio | H2 ml | Al/Do ratio | Activity kgPP/gcat | POLYMER ANALYSIS APS (micron) | BD (tapped) |
|---|---|---|---|---|---|---|---|---|---|
| ZN#525 Comparative Example | MGP#174 | 5/30 (DIBP addition after precursor and TiCl$_4$ contact) | 10.3 | 500 | 10 | 20 | 5.5 | 1464 | 0.37 |

Wherein "nd" means not determined (as the productivity is too low and hence the polymer sample is too less to carry out analysis).

The catalysts synthesized from different batches of precursor were found to be active for propylene polymerizations. Within the same precursor batch, as the contact time was increased, APS i.e. average particle size of the polymer increased indicating that the contact time of the precursor with the internal donor effect the PSD of the catalysts and hence the polymer.

Table 5 describes the effect of the contact time on the catalyst particle size and hence on the subsequent polymer particle

TABLE 5

| Catalyst | Precursor | ID contact time/temp min/° C. | D50 (micron) | Polymer APS (micron) |
|---|---|---|---|---|
| ZN#217 | MGP#75 | 90/30 | 46.2 | 1725 |
| ZN#244 | | 30/30 | 19.2 | 564 |
| ZN#216 | MGP#88 | 90/30 | 41.5 | 1841 |
| ZN#219 | | 30/30 | 19.0 | 628 |
| ZN#228 | | 5/30 | 11.0 | 567 |
| ZN#224 | MGP#95 | 90/30 | 49.3 | 1582 |
| ZN#233 | | 30/30 | 19.5 | 684 |
| ZN#227 | | 5/30 | 14.0 | 535 |
| ZN#241 | MGP#98 | 110/30 | 55.6 | 1969 |
| ZN#240 | | 60/30 | 42.4 | 1636 |
| ZN#234 | | 50/30 | 37.2 | 1516 |
| ZN#235 | | 35/30 | 20.1 | 712 |
| ZN#239 | | 30/30 | 19.2 | 619 |
| ZN#236 | | 5/30 | 13.8 | 595 |
| ZN#274 | MGP#126 | 60/30 | 46.7 | 1112 |
| ZN#277 | | 30/30 | 13.9 | 582 |
| ZN#275 | | 10/30 | 11.5 | 539 |
| ZN#416 | MGP#171 | 35/30 | 23.1 | 995 |
| ZN#417 | | 40/30 | 25.3 | 1182 |
| ZN#431 | | 45/30 | 32.4 | 1348 |
| ZN#456 | MGP#183 | 5/30 | 10.2 | nd |
| ZN#457 | | 15/30 | 15.7 | nd |
| ZN#458 | | 30/30 | 19.9 | 715 |
| ZN#459 | | 60/30 | 45.0 | 1130 |
| ZN#464 | MGP#173 Diether as internal donor | 5/30 | 17.8 | 1480 |
| ZN#465 | MGP#173 Ethyl benzoate as internal donor | 5/30 | 16.5 | 1419 |
| ZN#466 | MGP#173 Diethyl malonate as internal donor | 5/30 | 14.5 | 1214 |
| ZN#467 | MGP#174 | DIBP addition after precursor and TiCl$_4$ contact | 18.2 | 1417 |
| ZN#524 | MGP#174 | 90/30 | 49.1 | 1678 |
| ZN#521 | MGP#174 | 30/30 | 20.9 | 618 |
| ZN#522 | MGP#174 | 5/30 | 14.3 | 539 |
| ZN#526 Comparative Example | MGP#174 | 90/30 (DIBP addition after precursor and TiCl$_4$ contact) | 24.3 | 1380 |
| ZN#523 Comparative Example | MGP#174 | 30/30 (DIBP addition after precursor and TiCl$_4$ contact) | 14.1 | 1501 |
| ZN#525 Comparative Example | MGP#174 | 5/30 (DIBP addition after precursor and TiCl$_4$ contact) | 57.8 | 1464 |

Wherein "nd" means not determined (as productivity was low hence polymer sample was not enough to analyse).

In order to have more insight to the effect of internal donor contact time on the catalyst as well as polymer particle, D50 of the catalysts synthesized using same precursor (here MGP #98) with different contact time are plotted along with the APS of the subsequent polymer in the FIGURE.

For precursor MGP #98, a series of catalysts were prepared by varying the DIBP contact time. As clearly indicated by the FIGURE, as the contact period of the internal donor with the precursor is increased, D50 of the catalyst increases and hence this effect is also replicated in the polymer synthesized.

Table 6 describes the range of the contact time and the resulting

| ID contact time (min) | Catalysts D50 (micron) | Polymer APS (micron) |
|---|---|---|
| 5-30 | 10.0-20.0 | 500-700 |
| >30-50 | 25.0-33.0 | 900-1350 |
| >50-90 | 35.0-47.0 | 1100-1850 |
| >90 | ≥55.0 | ≥1900 |

We claim:

1. A process for controlling particle size of a catalyst composition, comprising the steps of:

(i) contacting an internal donor with an organo magnesium precursor solution to form an intermediate solution; and (ii) treating the intermediate solution with a transition metal compound to form a catalyst composition, wherein particle size of the catalyst composition is controlled by controlling a contact time of the internal donor with the precursor solution during formation of the intermediate solution.

2. The process as claimed in claim 1, wherein the internal donor used is selected from a group consisting of phthalates, benzoates, succinates, malonates, carbonates, diethers, and combinations thereof, wherein (a) the phthalate is selected from a group consisting of di-n-butyl phthalate, di-i-butyl phthalate, di-2-ethylhexyl phthalate, di-n-octyl phthalate, di-i-octyl phthalate, di-n-nonyl phthalate;

(b) the benzoate is selected from a group consisting of methyl benzoate, ethyl benzoate, propyl benzoate, phenyl benzoate, cyclohexyl benzoate, methyl toluate, ethyl toluate, p-ethoxy ethyl benzoate, p-isopropoxy ethyl benzoate;

(c) the succinate is selected from a group consisting of diethyl succinate, dipropyl succinate, dilsooropyl succinate, dibutyl succinate, diisobutyl succinate;

(d) the malonate is selected from a group consisting of diethyl malonate, diethyl ethylmalonate, diethyl propyl malonate, diethyl isopropylmalonate, diethyl butylmalonate;

(e) the carbonate compound is selected from a group consisting of diethyl 1,2-cyclohexanedicarboxylate, di-2-ethylhexyl 1,2-cyclohexanedicarboxylate, di-2-isononyl 1,2-cyclohexanedicarboxylate, methyl anisate, ethyl anisate; and (f) the diether compound is selected from a group consisting of 9,9-bis(methoxymethyl)fluorene, 2-isopropyl-2-isopentyl-1,3-dimethoxypropane, 2,2-diisobutyl-1,3-dimethoxypropane, 2,2-diisopentyl-1,3-dimethoxypropane, 2-isopropyl-2-cyclohexyl-1,3-dimethoxypropane.

3. The process as claimed in claim 1, wherein, the transition metal compound represented by M(OR''')pX4-p, where M is selected from a group consisting of Ti, V, Zr and Hf; X is a halogen atom; R'' is a hydrocarbon group and p is an integer having value equal or less than 4, the transition metal compound is selected from a group consisting of transition metal tetrahalide, alkoxy transition metal trihalide/aryloxy transition metal trihalide, dialkoxy transition metal dihalide, trialkoxy transition metal monohalide, tetraalkoxy transition metal, and mixtures thereof, wherein:

(a) the transition metal tetrahalide is selected from a group consisting of titanium tetrachloride, titanium tetrabromide and titanium tetraiodide and the likes for V, Zr and Hf;

(b) alkoxy transition metal trihalide/aryloxy transition metal trihalide is selected from a group consisting of methoxytitanium trichloride, ethoxytitanium trichloride, butoxytitanium trichloride and phenoxytitanium trichloride and the likes for V, Zr and Hf;

(c) dialkoxy transition metal dihalide is diethoxy transition metal dichloride and the likes for V, Zr and Hf;

(d) trialkoxy transition meta monohalide is triethoxy transition metal chloride and the likes for V, Zr and Hf; and (e) tetraalkoxy transition metal is selected from a group consisting of tetrabutoxy titanium and tetraethoxy titanium and the likes for V, Zr and Hf.

4. The process as claimed in claim 1, wherein the transition metal compound is titanium compound represented by Ti(OR'')pX4-p, where X is a halogen atom; R'' is a hydrocarbon group and p is an integer having value equal or less than 4.

5. The process as claimed in claim 1, wherein the organomagnesium precursor is liquid or solid in nature.

6. The process as claimed in claim 1, wherein the organomagnesium precursor is liquid in nature and is prepared by contacting magnesium source with organohalide and alcohol in presence of a solvent in a single step.

7. The process as claimed in claim 1, wherein the organomagnesium precursor is solid in nature and is prepared by first contacting the magnesium source with organohalide in presence of solvating agent as the first step and then followed by addition of alcohol.

8. The process as claimed in claim 7, wherein the solvating agent is selected from a group consisting of dimethyl ether, diethyl ether, dipropyl ether, diisopropyl ether, ethylmethyl ether, n-butylmethyl ether, n-butylethyl ether, di-n-butyl ether, diisobutyl ether, isobutylmethyl ether, and isobutylethyl ether, dioxane, tetrahydrofuran, 2-methyl tetrahydrofuran, tetrahydropyran and combination thereof.

9. The process as claimed in claim 7, wherein the magnesium source is selected from a group consisting of magnesium metal, dialkyl magnesium, alkyl/aryl magnesium halides and mixtures thereof; wherein:

(a) the magnesium metal is in form of powder, ribbon, turnings, wire, granules, block, lumps, chips;

(b) the dialkylmagnesium compounds is selected from a group consisting of dimethylmagnesium, diethylmagnesium, diisopropylmagnesium, dibutylmagnesium, dihexylmagnesium, dioctylmagnesium, ethylbutylmagnesium, and butyloctylmagnesium; and (a) alkyl/aryl magnesium halides is selected from a group consisting of methylmagnesium chloride, ethylmagnesium chloride, isopropylmagnesium chloride, isobutylmagnesium chloride, tert-butylmagnesium chloride, benzylmagnesium chloride, methylmagnesium bromide, ethylmagnesium bromide, isopropylmagnesium bromide, isobutylmagnesium bromide, tert-butylmagnesium bromide, hexylmagnesium bromide, benzylmagnesium bromide methylmagnesium iodide, ethylmagnesium iodide, isopropylmagnesium iodide, isobutylmagnesium iodide, tert-butylmagnesium iodide, and benzylmagnesium iodide.

10. The process as claimed in claim 7, wherein the organohalide is selected from a group consisting of alkyl halides either branched or linear, halogenated alkyl benzene/benzylic halides haying an alkyl radical contains from about 10 to 15 carbon atoms and mixtures thereof; wherein:

(a) the alkyl halides is selected from a group consisting of methyl chloride, ethyl chloride, propyl chloride, isopropyl chloride, dichloromethane, chloroform, carbon tetrachloride, 1,1-dichloropropane, 1,2-dichloropropane, 1,3-dichloropropane, 2,3-dichloropropane, n-butyl chloride, iso-butyl chloride, 1,4-dichlorobutane, tert-butylchloride, amylchloride, tert-amylchloride, 2-chloropentane, 3-chioropentane, 1,5-dichloropentane, 1-chloro-8-iodoctane, 1-chloro-6-cyanohexane, cyclopentylchloride, cyclohexylchloride, chlorinated dodecane, chlorinated tetradecane, chlorinated eicosane, chlorinated pentacosane, chlorinated triacontane, iso-octylchloride, 5-chloro-5-methyl decane, 9-chloro-9-ethyl-6-methyl eiscosane; and
(b) the halogenated alkyl benzene/benzylic halides is selected from a group consisting of benzyl chloride and a,a' dichloro xylene.

11. The process as claimed in claim 7, wherein the alcohol is selected from a group consisting of aliphatic alcohols, alicyclic alcohols, aromatic alcohols, aliphatic alcohols containing an alkoxy group, diols and mixture thereof; wherein:
(a) the aliphatic alcohols is selected from a group consisting of methanol, ethanol, propanol, n-butanol, iso-butanol, t-butanol, n-pentanol, iso-pentanol, n-hexanol, 2-methylpentanol, 2-ethylbutanol, n-heptanol, n-octanol, 2-ethylhexanol, decanol and dodecanol,
(b) the alicyclic alcohols is selected from a group consisting of cyclohexanol and methylcyclohexanol,
(c) the aromatic alcohols is selected from a group consisting of benzyl alcohol and methylbenzyl alcohol,
(a) the aliphatic alcohols containing an alkoxy group is selected from a group consisting of ethyl glycol and butyl glycol; the diols is selected from a group consisting of catechol, ethylene glycol, 1,3-propanediol, 1,4-butanediol, 1,5-pentanediol, 1,8-octanediol, 1,2-propanediol, 1,2-butanediol, 2,3-butanediol, 1,3-butanediol, 1,2-pentanediol, p-menthane-3,8-diol, and 2-methyl-2,4-pentanediol.

12. The process as claimed in claim 1, wherein the organomagnesium precursor solution is obtained by dissolving the organomagnesium precursor in a solvent.

13. The process as claimed in claim 12, wherein the solvent is selected from group consisting of chlorinated aromatic hydrocarbon, non-chlorinated aromatic hydrocarbon chlorinated aliphatic hydrocarbon, non-chlorinated aliphatic hydrocarbon and combination thereof.

14. The process as claimed in claim 12, wherein the solvent is comprising from 5 to 95 volume percent and is selected from group consisting of benzene, decane, kerosene, ethyl benzene, chlorobenzene, dichlorobenzene, toluene, o-chlorotoluene, xylene, dichloromethane, chloroform, cyclohexane, and combination thereof.

15. The process as claimed in claim 1, wherein the internal donor is contacted with an organomagnesium precursor solution at a temperature form −30 to 100° C.

16. The process as claimed in claim 1, wherein the catalyst composition is Ziegler-Natta catalyst.

17. The process as claimed in claim 1, wherein controlling the contact time of the internal donor with the precursor solution during formation of the intermediate solution comprises:
maintaining the contact time of the internal donor with the precursor solution during formation of the intermediate solution between 5 to 120 minutes to obtain the catalyst composition having average particle size in the range of 10 to 60 microns; maintaining the contact time of the internal donor with the precursor solution during formation of the intermediate solution between 10 to 90 minutes to obtain the catalyst composition having average particle size in the range of 20 to 50 microns; and
maintaining the contact time of the internal donor with the precursor solution during formation of the intermediate solution between 10 to 60 minutes to obtain the catalyst composition having average particle size in the range of 20 to 45 microns.

18. The process as claimed in claim 1, wherein controlling the contact time of the internal donor with the precursor solution during formation of the intermediate solution comprises:
maintaining the contact time of the internal donor with the precursor solution during formation of the intermediate solution between 5 to 30 minutes to obtain the catalyst composition having average particle size in the range of 10 to 20 microns;
maintaining the contact time of the internal donor with the precursor solution during formation of the intermediate solution between >30 to 50 minutes to obtain the catalyst composition having average particle size in the range of 25 to 33 microns;
maintaining the contact time of the internal donor with the precursor solution during formation of the intermediate solution between >50 to 90 minutes to obtain the catalyst composition having average particle size in the range of 35 to 47 microns; and
maintaining the contact time of the internal donor with the precursor solution during formation of the intermediate solution greater than 90 minutes to obtain the catalyst composition having average particle size of ≥1900 microns.

* * * * *